United States Patent

[11] 3,612,981

[72] Inventors Horst Anton Heller;
    Walter Erich Mehnert, both of Munich, Germany
[21] Appl. No. 840,301
[22] Filed July 9, 1969
[45] Patented Oct. 12, 1971
[73] Assignee Entwicklungsring Sud GmbH
    Munich, Germany
[32] Priority July 19, 1968
[33] Germany
[31] P 17 63 697.4

[54] CONTROL SYSTEM FOR GENERATOR HAVING RADIO TRANSMISSION FEEDBACK MEANS
    1 Claim, 1 Drawing Fig.
[52] U.S. Cl. .................................................. 322/27,
    310/68 D, 322/73
[51] Int. Cl. .................................................. H02p 9/30
[50] Field of Search .......................................... 322/25, 27, 28, 59, 73; 310/68

[56] References Cited
UNITED STATES PATENTS

| | | | |
|---|---|---|---|
| 3,290,582 | 12/1966 | Roosma et al. ............... | 322/25 |
| 3,401,328 | 9/1968 | Hartung ....................... | 322/28 |
| 3,412,271 | 11/1968 | Hall............................. | 310/68 |

Primary Examiner—Oris L. Rader
Assistant Examiner—H. Huberfeld
Attorney—William K. Serp ABSTRACT: An electric generator system which includes a thyristor mounted within the generator rotor for controlling the field current, and a voltage regulator the output of which is coupled by means of a radio frequency transmitting unit to the generator rotor and fed into a combining unit. The combining unit additionally receives a signal from the exciter circuit as well as a third signal from a measuring unit. The measuring unit serves to continuously measure the current fluctuations in the exciter circuit. The output of the combining unit is fed to the gate of the control rectifier thereby regulating the current flow through the generator winding.

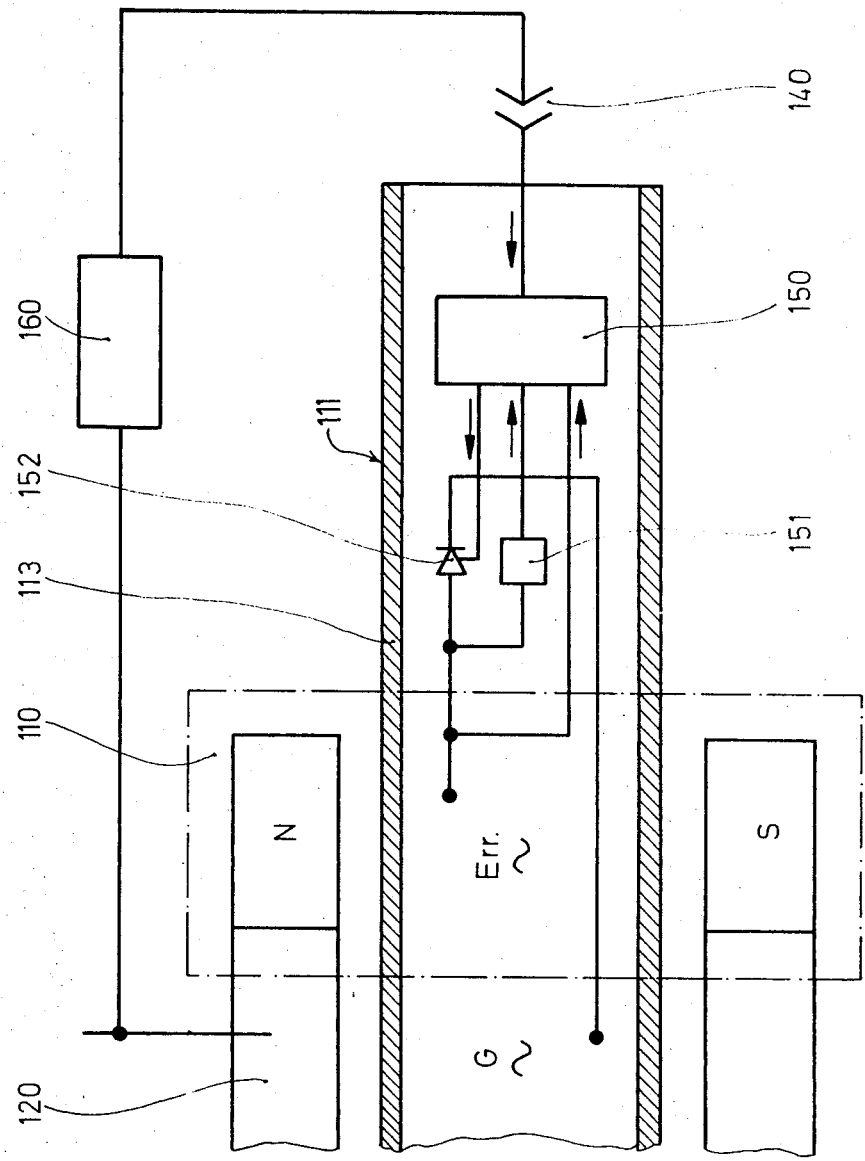

CONTROL SYSTEM FOR GENERATOR HAVING RADIO TRANSMISSION FEEDBACK MEANS

BACKGROUND OF THE INVENTION

This invention relates to an electrical generator control system, especially adapted for use with air and space vehicles and includes a voltage regulator and a self-excited generator. The system includes controlled rectifiers mounted in the generator rotor; and a radiofrequency transmitter and receiver are provided in place of conventional brushes as further described in our corresponding U.S. Pat. application Ser. No. 724,478 filed Apr. 26, 1968 and entitled, "Electric Generator Control system." The illustrated embodiment provides that the excitation of fluctuations serving to provide voltage control be used to obtain the appropriate positive or negative additive voltage by means of thyristors. The purpose of this particular feature is the retention of a condition which exists prior to the load change and further to prevent the retention of either positive or negative voltage peaks.

The illustrated embodiment achieves this object by including a measuring unit which continuously measures the current variations in the exciter circuit. The measuring unit applies a signal related to these variations as an error signal to a combining unit. The second input to the combination unit is the error signal obtained from the voltage regulator; and the third input is the constant voltage. The three inputs are processed to provide an optimal average voltage. The latter two inputs are processed with each other to provide a voltage which determines the timing of the firing pulse for the thyristors. In this manner, reliability is considerably increased since coarse regulation takes place prior to regulation by the main voltage regulator.

Other objects and advantages of the invention will become apparent with reference to the following description and accompanying drawing which shows an illustrated embodiment of this invention.

BRIEF DESCRIPTION OF THE DRAWING

The FIGURE is a diagrammatic illustration of a generator system embodying certain features of this invention.

DESCRIPTION OF THE PREFERRED EMBODIMENT

With respect to the FIGURE, when the load of the synchronous generator 111 varies, the exciter current in the exciter winding 110 varies with the gradient in the load current. The reason for this occurrence lies in the retention of the excitation field at the instant of load change due to the inductive characteristics of the field winding. The current components in the exciter winding 110 involved in the subsequent balancing processes are the induced current, the initial current prior to the load change and the current derived from the voltage regulator. The invention, based on these conformities with natural laws, suggests that with a device as described in U.S. Pat. application Ser. No. 724,478, the exciter current, which provides a quantitative as well as qualitative measure of the disturbance in the balanced condition at the instant of load change $t=0$, is used to eliminate the disturbance in balance. The condition occurs in rotor 113 by measuring the exciter current. The measurement is performed by a measuring unit 151, which, in this case, consists of a shunt and a current measuring means. The measuring unit comprises a shunt of the type No. 1813–952, manufactured by the Hartman and Braun Company. The so-called "shunt" may comprise a relatively high value lumped resistance element connected in parallel with the exciter current bus, the voltage across the resistance element being proportional to the exciter current and hence reflecting variations and fluctuations in this current. The output of the measuring means is fed to a combining unit 150 in which the timing components for the firing of the thyristors 152 are combined. The combining unit is an adder with three inputs. An example of a unit suitable for use in this system is MC 1439 manufactured by Motorola. The timing components include a signal which produces the best possible average voltage value for all operating conditions, a voltage which is derived from the signal regulator 160 by means of the radiofrequency unit 140 and which is dependent upon the actual voltage, and the previously described signal derived from the excitation current change. These three components produce the effective firing time angle or the firing impulse which causes the thyristors to fire at the required time. An example of the signal or voltage regular suitable for use in this system is G 20–B9–2 of the AEG Company in Germany. The radiofrequency unit includes a transmitter and receiver and suitable transmitting and receiving antennas. These antennas may each comprise a standard dipole antenna. The transmitter is an ordinary oscillator which is set for the transmitting frequency, with a corresponding modulation stage, where the regulating signal is mixed in a known manner with a carrier signal. In the receiver, the regulating signal is again separated from the carrier signal by a demodulation stage and is transmitted in an amplified manner. All these circuits are basic circuits and elements of radio engineering.

There are two primary advantages to be obtained by means of the illustrated embodiment. Firstly, there are substantially no time constants of any importance associated with the determination and stabilization of the regulator deviations; and secondly, the reliability of the generator system 120 or of the voltage control is improved by using several regulation components.

Although only one specific embodiment of this invention has been shown and described herein, it will be understood that certain details of the construction shown may be altered without departing from the spirit and scope of this invention.

We claim:

1. The electrical generator system, particularly adapted for use with air and space vehicles, comprising a generator, an exciter, a common shaft for mounting the armature winding of the exciter and the field winding of the generator, a voltage regulating means connected to the stationary armature winding of the generator, controlled rectifier means mounted within said common shaft for controlling the generator field current, control means for controlling firing of the controlled rectifier means, radiofrequency means for coupling the output of said regulating means to said control means, and comprising a radiofrequency transmitter connected to said voltage regulating means and a receiver mounted on said common shaft for receiving the output of said transmitter sensing means for sensing the fluctuations in exciter current and for producing an output signal in accordance therewith, and reference means connected to the exciter for producing a constant reference signal said control means including summing means including, a first input connected to the output of said receiver, a second input connected to the output of said sensing means for summing the outputs of said receiver, said measuring means and said reference means for producing a resultant control signal for controlling firing of said controlled rectifier means and hence controlling the generator field current.